3,108,873
MEAT-LIKE PRODUCT AND PROCESS
Jack R. Durst, Minneapolis, Minn., assignor to The Pillsbury Company, Minneapolis, Minn., a corporation of Delaware
No Drawing. Filed Sept. 12, 1960, Ser. No. 55,159
11 Claims. (Cl. 99—14)

This invention relates to a food product and more particularly to a highly nutritious fabricated meat-like product which duplicates the general characteristics of such meat-base products as luncheon loaves and spreads, and is a continuation-in-part of co-pending application Serial No. 757,942, filed August 29, 1958, now Patent No. 2,952,544, and assigned to the same assignee.

Conventional meat-base products of the type described are characterized by their moist, chewy properties and their dominant meat flavor. However, since the principal ingredient of such products is meat, their average cost has necessarily remained relatively high notwithstanding the fact that the meats utilized in their manufacture are generally by-products of the meat packing process. As a result, many efforts have been made to duplicate these products by utilizing such materials as processed vegetable protein as the principal constitutent. While some of these attempts have been reasonably successful, all of them have, to my knowledge, been wanting in one or more important respects.

It is, therefore, an object of the instant invention to provide meat-like products of this type which will have all of the important characteristics of comparable meat base products without requiring that the principal ingredient be a meat composition.

I have found that I can successfully provide such products by forming a unique, stable, gel-like dispersion comprising a continuous, external, cellular, phase formed from an edible, hydrated, hydrophilic film-former; and a discontinuous, internal phase formed from an edible lipophilic fluid.

To produce the meat-like products of my invention, I first slurry together an edible, fluid, hydrophilic, film-forming composition, as for example fresh egg white, and an edible, lipophilic fluid, as for example an edible liquid oil or fat. Then I beat the slurry to form the film-forming composition into a continuous, cellular, external phase and to simultaneously disperse (i.e., particlize and distribute) the lipophilic fluid within the continuous phase. The dispersion thus formed will be of relatively higher viscosity than the original slurry of constituents and may be characterized conveniently as a stable gel-like dispersion of a lipophilic fluid within a hydrophilic, fluid, film-forming composition. After I have thus formed the gel-like dispersion of my invention, I may, if desired, lower the viscosity of the dispersion to render the same more spreadable by blending in additional quantities of water which will, once the original dispersion is formed, be taken up by the hydrophilic external phase without causing any degeneration of the dispersion. Alternatively, I may increase the viscosity to render it less spreadable, or even sliceable, by simply heating it until the product becomes as viscous and bodied as desired.

In selecting a film-forming composition, I may utilize any suitable edible material. For example, I have found that I may utilize soy protein, wheat protein, wheat germ, or egg albumen, and I have even utilized hydrophilic colloids such as gelatin, agar, and carboxy-methylcellulose. I have also found that the film-forming component may be either in hydrated form or may be hydrated during processing. For example, I may start with fresh egg albumen or I may slurry a dry egg albumen along with the oil component in sufficient water to hydrate the albumen as slurrying and beating proceed. It is important, however, that I do not use excessively more water than is required to hydrate the film-forming composition selected, at the dispersion forming stage. An excessive surplus of water at this point tends to have a detrimental effect on the stability of the ultimate dispersion.

In selecting the liquid oil or fat composition, I may utilize any of the edible liquid oils or fats, as for example, corn oil, cottonseed oil, or melted shortening. Moreover, I have found that I may conveniently utilize the oil constituent of my dispersion to carry any additives which I may desire to incorporate into the end product. For example, I have found that I may conveniently include a flavoring, coloring composition, or even a filler such as comminuted wheat germ or a powdered yeast composition.

While I have found it unnecessary to employ emulsifying agents in preparing my stable dispersion, their presence is not harmful and may even be desirable for certain purposes, such as texturing. It is, of course, important to the process of my invention that either a hydrated film-forming composition, or a powdered film-forming composition in the presence of sufficient water to hydrate the same, be brought together with the oil constituent before the beating operation is commenced. After the beating stage is completed, however, and the dispersion is formed, I find that I may add additional quantities of water without affecting the stability of the dispersion. Moreover, I have found that I may just as conveniently subject the dispersion to heating or other suitable means to partially dehydrate the same without affecting its stability.

By processing a suitable film-forming composition and a suitable liquid oil or fat in the manner described, I am able to substantially duplicate the moistness and chewiness which characterizes meat-base products such as luncheon meats and spreads. Moreover, by subsequent drying i.e., heat setting, or dilution, I am able to vary the physical state of my products to produce varying and remarkable physical properties which amount to far more than mere changes in viscosity. For example, I may render the gel-like dispersion product relatively rigid and sliceable by dehydrating it or heat setting it or I may render it relatively soft and spreadable by diluting it with additional quantities of water.

In providing my products with the desired flavor and color, I have found that I may either incorporate both the flavoring and coloring into the oil phase before the same is slurried with the film-forming phase or that I may incorporate flavoring and coloring into either the water of hydration or the water of dilution. It is, of course, also possible to incorporate part or all of the flavoring and coloring ingredients in either the oil phase or the aqueous phase.

Once the dispersion has been formed and is completely prepared in respect of flavoring, coloring, and any other additional ingredients that may be desired, I have found it desirable, though not essential, to subject the product to sufficient retorting or other suitable sterilization means to insure that the same will not readily spoil.

To further illustrate my invention, I shall describe certain specific embodiments thereof in detail in the following examples. It is to be understood, however, that these examples are given only by way of illustration and that my invention is not limited thereto.

*Example 1*

I prepared a spread product by blending together 50 parts of ground dried yeast, 50 parts of ground dried wheat germ, 10 parts of salt and 120 parts of corn oil until the oil had coated the other ingredients. I then added 52 parts of fresh egg albumen and 80 parts of water. I vigorously agitated this mixture for several minutes to disperse the oil constituent throughout the aqueous phase and to convert the aqueous phase into a continuous, cellular film thereby forming a stable dispersion comprising a continuous, cellular, proteinaceous, aqueous phase and a dispersed oil phase, the particles of which were entrapped within cells of the aqueous phase. To provide the dispersion thus formed with flavor and color, I admixed 100 parts of water with 113 parts of relish, 10 parts of Worcestershire sauce, and 5 parts of onion powder. I then added the flavoring and coloring mixture to the dispersion and blended the two together after which the entire stable gel-like dispersion was sterilized by retorting in sealed containers at 250° F. and 15 pounds pressure for one and one-half hours.

The product thus produced was found to have a dominant meat-like flavor and a color, texture, eating quality, and consistency fully comparable to conventional meat-base spreads. Moreover, retorting did not cause the product to shrink away from its container and did not cause any oil separation.

Example II

I also prepared a luncheon loaf by blending together 200 parts of cottonseed oil, 50 parts of dry ground wheat germ, 50 parts of dry powdered yeast and 15 parts of salt until the oil had coated the other ingredients. I then added 60 parts fresh egg white and 50 parts water. This blend was thoroughly agitated to disperse the oil phase throughout the aqueous phase and to convert the aqueous phase into a continuous cellular structure which entrapped particles of the dispersed discontinuous oil phase within its cells. To flavor and color this product, I then admixed it with 50 parts of water into which I had previously blended 20 parts of barbecue flavoring. The product was then packed in sealed containers and sterilized by retorting at 250° F. and 15 pounds pressure for one and one-half hours.

The product thus produced was in the form of a rigid loaf having a dominant meat flavor and the appearance and texture of a meat-base luncheon loaf.

Example III

I have also prepared a luncheon loaf by mixing together 250 parts of melted shortening, 50 parts of ground yeast, 10 parts of salt, and 20 parts of barbecue flavoring until the melted shortening coated the rest of the ingredients. I then added 60 parts of hydrated soy protein and 50 parts water. This slurry was subjected to vigorous beating until a stable oil-in-water type dispersion was formed after which I added an additional 50 parts of water and then retorted the product at 250° F. and 15 pounds pressure for one and one-half hours to insure against spoilage. The product thus formed was also of a moist, chewy consistency and possessed a dominant meat flavor.

Example IV

I have also prepared a powdered meat-like spread product by mixing 120 parts corn oil, 50 parts of dry ground wheat germ, 50 parts of dry powdered yeast and 10 parts of salt until the oil had coated the other ingredients. I then added 100 parts oyster nectar. I vigorously agitated this mixture for several minutes to hydrate the film-forming protein in the wheat germ and to disperse the oil throughout the aqueous phase and to convert the aqueous phase into a continuous cellular film thereby forming a stable dispersion comprising a continuous cellular proteinaceous, aqueous phase and a dispersed oil phase, the particles of which were entrapped within cells of the aqueous phase. After this stable dispersion was formed, I admixed an additional 80 parts of oyster nectar and 400 parts of water in order to reduce the viscosity of the product to a point where it could be spray dried. I then spray dried the product. A stable light tan powder resulted which when added to water gave an oyster flavored meat-like spread product comparable to conventional meat base spreads.

From the foregoing, it may be seen that the product and process of my invention provide the food art with meat-like products which possess the important characteristics of meat-base compositions such as luncheon loaves and spreads without requiring that the principal ingredient comprise a meat composition.

While I have shown certain specific embodiments of my invention in the foregoing examples, I am not limited to these particular embodiments and I have prepared many other physical varieties of meat-like products as well as many varieties of flavors including beef, chicken, garlic, onion, cheese, oyster, braunschweiger, clam and deviled ham.

What I claim is:

1. A process for making a meat-like food product, said process comprising the steps of;
    mixing an edible hydrophilic film-forming composition together with an edible lipophilic fluid in the presence of a quantity of water not excessively greater than said film-former will assimilate as water of hydration;
    and beating said mixture until said lipophilic fluid becomes dispersed within said film-forming composition.

2. The process of claim 1 wherein said film-former composition comprises egg albumen.

3. The process of claim 1 wherein said film-former and water are provided by fresh egg white.

4. The process of claim 1 wherein said lipophilic fluid comprises an edible oil.

5. The process of claim 1 wherein said lipophilic fluid comprises melted, normally solid, fat.

6. The process of claim 1 wherein said lipophilic fluid comprises liquid oil.

7. A process for making a meat-like food product, said process comprising the steps of;
    mixing an edible hydrophilic film-forming composition together with an edible lipophilic fluid in the presence of a quantity of water not excessively greater than said film-former will assimilate as water of hydration;
    beating said mixture until said lipophilic fluid becomes dispersed within said film-forming composition;
    and, removing at least a portion of said water of hydration.

8. A process for making a meat-like food product, said process comprising the steps of;
    mixing an edible hydrophilic film-forming composition together with an edible lipophilic fluid in the presence of a quantity of water not excessively greater than said film-former will assimilate as water of hydration;
    beating said mixture until said lipophilic fluid becomes dispersed within said film-forming composition;
    and, admixing the dispersion thus formed with water.

9. A meat-like food product produced in accordance with the method of claim 1.

10. A meat-like food product produced in accordance with the method of claim 7.

11. A meat-like food product produced in accordance with the method of claim 8.

References Cited in the file of this patent

UNITED STATES PATENTS

| | | |
|---|---|---|
| 2,730,447 | Boyer | Jan. 10, 1956 |
| 2,785,069 | Dudman | Mar. 12, 1957 |
| 2,952,544 | Durst et al. | Sept. 13, 1960 |